United States Patent [19]

Hughen et al.

[11] Patent Number: 5,607,790
[45] Date of Patent: Mar. 4, 1997

[54] ELECTROCHEMICAL CELL LABEL WITH INTEGRATED TESTER

[75] Inventors: John Hughen, Cucamonga, Calif.; Scott Ferguson, Danbury; Michael Garris, Litchfield, both of Conn.

[73] Assignee: Duracell Inc., Bethel, Conn.

[21] Appl. No.: 456,428

[22] Filed: Jun. 1, 1995

Related U.S. Application Data

[63] Continuation-in-part of Ser. No. 315,317, Sep. 29, 1994.
[51] Int. Cl.$^6$ ............................................. H01M 10/48
[52] U.S. Cl. ................................................ 429/93
[58] Field of Search ................................. 429/91–93

[56] References Cited

U.S. PATENT DOCUMENTS

| | | | |
|---|---|---|---|
| 1,497,388 | 6/1924 | Sterling . | |
| 4,608,323 | 8/1986 | Zaborney | 429/167 |
| 4,702,563 | 10/1987 | Parker | 350/351 |
| 4,702,564 | 10/1987 | Parker | 350/351 |
| 4,717,710 | 1/1988 | Shimizu et al. | 503/213 |
| 4,723,656 | 2/1988 | Kiernan | 206/333 |
| 4,737,020 | 4/1988 | Parker | 350/351 |
| 4,812,541 | 3/1989 | Mallya et al. | 526/264 |
| 4,835,476 | 5/1989 | Kurosawa | 324/435 |
| 5,015,544 | 5/1991 | Burroughs et al. | 429/93 |
| 5,059,895 | 10/1991 | Cataldi et al. | 324/104 |
| 5,128,616 | 7/1992 | Palmer | 324/435 |
| 5,156,931 | 10/1992 | Burroughs et al. | 429/93 |
| 5,188,231 | 2/1993 | Kivell et al. | 206/333 |
| 5,190,609 | 3/1993 | Lin et al. | 156/85 |
| 5,223,003 | 6/1993 | Tucholski et al. | 29/623.4 |
| 5,250,905 | 10/1993 | Kuo et al. | 429/91 X |
| 5,389,458 | 2/1995 | Weiss et al. | 429/90 |
| 5,393,618 | 2/1995 | Weiss et al. | 429/90 |
| 5,409,788 | 3/1995 | Weiss et al. | 429/93 |
| 5,418,085 | 5/1995 | Huhndorff et al. | 429/91 |
| 5,460,902 | 10/1995 | Parker et al. | 429/93 X |
| 5,478,665 | 12/1995 | Burroughs et al. | 429/92 X |

FOREIGN PATENT DOCUMENTS 523901  1/1993  European Pat. Off. .

*Primary Examiner*—Stephen Kalafut
*Attorney, Agent, or Firm*—Robert J. Feltovic; Rose M. Allen; Barry D. Josephs

[57] ABSTRACT

A label for an electrochemical cell with a condition tester for the cell integrated with the label to form a label/tester composite is disclosed. The label/tester composite has a thermochromic material in thermal contact with an electrically conductive material. A substructure containing a cured conductive material and preferably also a thermochromic material is formed on a releasable web and transferred from the releasable web to the inside surface of the heat shrinkable base film. A partition coating may be applied over the transferred conductive material. Preferably, a sheet of paper or plastic film having a large window opening therein for entrapping air is applied over the partition coating and aligned over the heat generating portion of the conductive material. The label/tester composite is applied to the cell housing with the insulating paper or plastic film with window opening against the cell housing. The tester may be activated by depressing one or two regions on its surface thereby connecting the conductive material to the terminals of the cell, whereupon the conductive material becomes heated causing a change in appearance of the thermochromic material to indicate the condition of the cell.

33 Claims, 10 Drawing Sheets

ELECTROCHEMICAL CELL LABEL WITH INTEGRATED TESTER

This is a continuation-in-part of application Ser. No. 08/315,317 filed Sep. 29, 1994.

This invention relates to a label containing an electrochemical cell condition tester thereon and cells containing the label.

Commercially available testers to determine the condition of an electrochemical cell are typically of the thin film heat responsive type. This type of tester typically contains an electrically conductive coating on one side of a heat resistant film and a thermochromic coating on the other side. Such testers are commercially available in the form of strips which are not integrated into the cell or cell label. To use the tester one must apply it to the terminal ends of the cell being tested. This completes an electrical circuit in the conductive coating and causes heating in that coating. The width of the conductive coating can be varied along its length, resulting in the narrower portion being heated to a higher temperature than the wider portion. As a threshold temperature is reached along different portions of the conductive coating, a portion of the thermochromic coating in proximity thereto may change in clarity to reveal an underlying color coating. A graphic scale alongside the various portions of the thermochromic coating indicates the condition of the cell. Examples of such testers and their application are disclosed in U.S. Pat. Nos. 4,723,656 and 5,188,231.

The use of testers on electrochemical cells has long been known. (See, e.g. U.S. Pat. No. 1,497,388). However, incorporation onto a label of a heat responsive tester of the type disclosed, e.g. in U.S. Pat. No. 4,702,564, using modern technology and high speed equipment poses significant problems. One or more of the tester components, for example the conductive coating, normally requires heat treatment or curing. Modern battery labels are made of heat shrinkable plastic. One significant manufacturing problem has been how to cure the conductive coating without causing deformation or shrinking of the underlying heat sensitive label. Stand alone heat responsive testers have heretofore applied the conductive coating onto a polyester film. Since such film is capable of withstanding the curing temperatures, the conductive coating can be cured while on the film. However, such film is not useful for modern battery labels. This problem has been overcome in accordance with the present invention.

The invention will be better understood with reference to the drawings in which.

The present invention overcomes the above mentioned impediments to feasible manufacture of reliable on-cell thermochromic testers. The present invention avoids the need to cure the conductive coating on the label thereby eliminating deformation or shrinking of the label and making it possible to integrate a heat responsive tester with the cell label. In the present invention the conductive coating is cured on a releasable heat resistant web and then transferred from the web to the cell label.

The invention in one embodiment is directed to an electrochemical cell and a label/tester composite thereon. The composite includes a film having a thermochromic material disposed thereon, an electrically conductive material in thermal contact with the thermochromic material and means for thermally insulating the conductive material from the cell housing, said means comprising an opening in a substantially electrically nonconductive material wherein the opening is of sufficient size to cover a substantial portion of the conductive material. The opening preferably covers at least 40% of the heat generating portion of the conductive material and is larger than any cavity in the composite through which a portion of the conductive material may be manually pushed to activate the tester.

Figure 1:
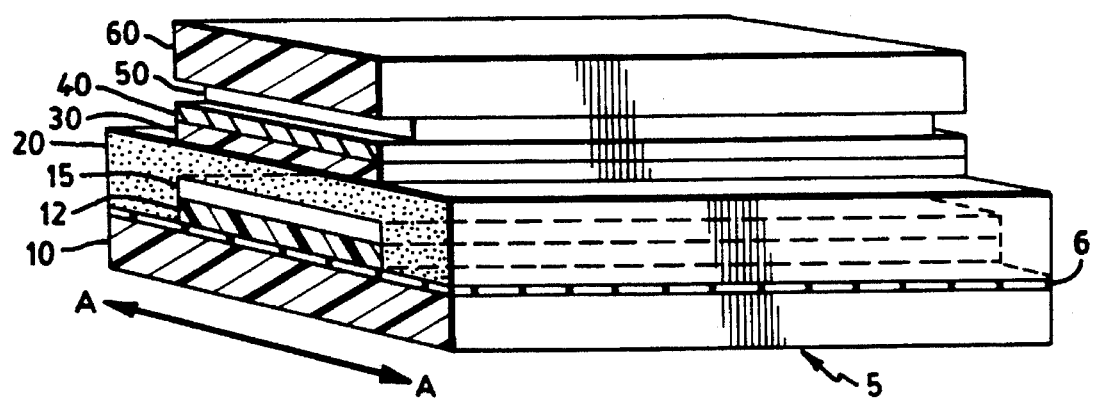
FIG. 1 is an enlarged partial isometric view, shown partially in cross-section, of the composite cell tester integrated with the label and forming the label/tester composite of the invention.

A desirable structure of the composite tester integrated with the cell label (label/tester composite 5) is shown in FIG. 1. The label/tester composite 5 has a thickness under 100 mil (2.5 mm), desirably between about 4 mil and 20 mil (0.1 mm and 0.5 mm). Label/tester composite 5 comprises a label backing 10 (base film), preferably having a print layer 6 on its inside surface. Label backing 10 serves as a substrate for the tester components integrated therewith. Print layer 6 may be formed of conventional non-conductive ink and may contain text, logo, or other printed design giving the cell label an identifiable appearance. Print layer 6 may have void regions, for example, over a portion of the tester creating a window for viewing a color change in the tester when the tester is activated. A heat sensitive coating, preferably a thermochromic coating 12, is formed over a portion of print layer 6. Preferably a color coating 15 is formed over thermochromic coating 12. Label backing 10 is a heat shrinkable film, preferably unplasticized polyvinylchloride or polypropylene. Thermochromic coating 12 may be composed of conventional reversible thermochromic inks. This class of ink is known in the art and, for example, alluded to in U.S. Pat. No. 4,717,710. When the thermochromic coating 12 becomes heated to a response activation temperature, typically of about 37° C., it turns from opaque to clear thereby exposing the underlying color coating 15. A preferred thermochromic ink for use in the composite tester of the invention is available as Type 37 thermochromic ink from Matsui International Co., Inc. Color coating 15 may be any conventional printing ink with colorant chosen to give the coating a sharp, distinct color. Although it is preferable to include color coating 15, this coating could be eliminated by incorporating additional coloring agents within coating 12.

Figure 2A:
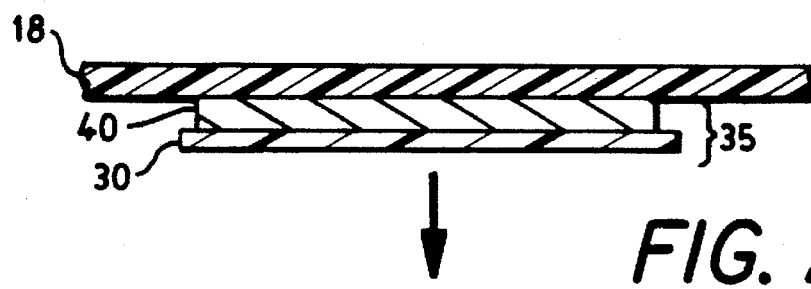
FIGS. 2A and 2B are enlarged end views of intermediate products used in the manufacture of the label/tester composite shown in FIG. 1.
Figure 2B:
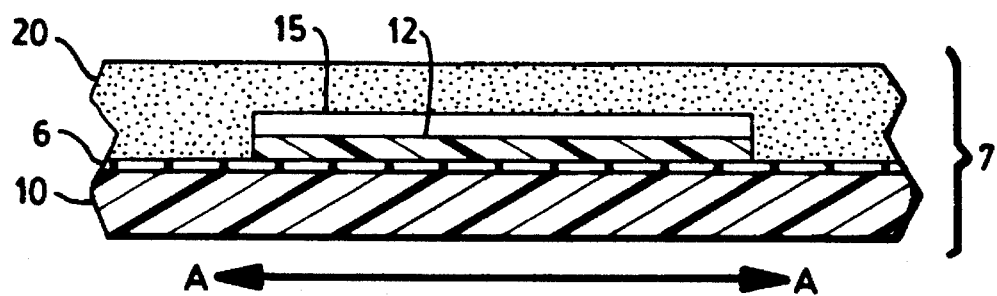
Figure 2C:
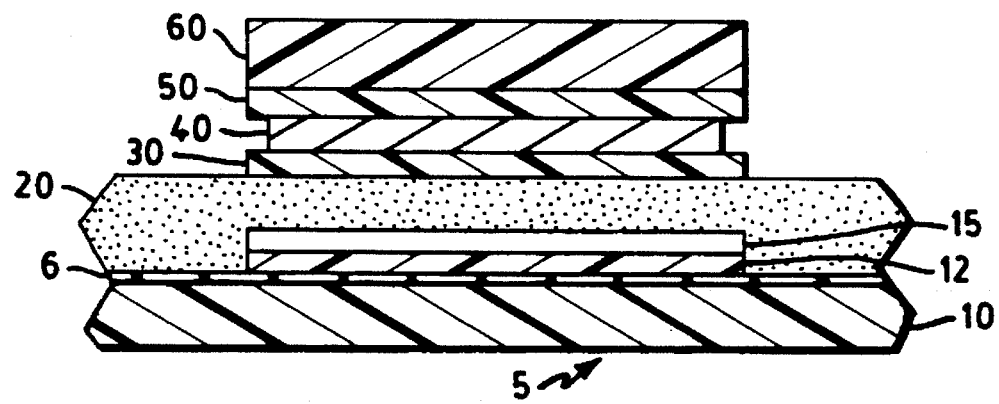
FIG. 2C is an end view of a portion of the completed label/tester composite of FIG. 1.

An adhesive coating 20 is applied over color coating 15 and also directly over the inside surface of the remaining portion of label 10 over print layer 6. Thus, thermochromic coating 12 and color coating 15 preferably lie between label backing 10 and adhesive coating 20, e.g., as shown in FIG. 2C. Suitable adhesive 20 may be advantageously selected from the well known acrylic or rubber based class of high performance pressure sensitive adhesives. The adhesive is desirably transparent, particularly if a portion of the adhesive is interposed between the label and the thermochromic layer. A suitable adhesive 20 may be formed from a solvent based adhesive polymer solution sold under the trade designation AROSET 1860-2-45 by Ashland Chemical Co., Dublin, Ohio. This adhesive and its use is referenced in U.S. Pat. No. 5,190,609. For use in the context of the present invention adhesive 20 may be prepared by first coating a release coated web (not shown), e.g. silicone coated paper, with the AROSET adhesive polymer solution and drying (or curing) the adhesive while still on the web. The dried adhesive 20 may then be transferred from the web to the inside surface of label 10, i.e. over the label's exposed print coating 6 and tester color coating 15 (FIG. 2B).

Alternatively, adhesive 20 may be formed of a high performance curable (crosslinkable) acrylic adhesive as disclosed in U.S. Pat. No. 4,812,541, herein incorporated by reference,e.g. examples 1 and 2 therein.

Conductive coating 40 may be selected from known thin film highly electrically conductive coatings. Advantageously, coating 40 has a thickness of between about 0.25 mil and 1.0 mil (0.006 mm and 0.025 mm), preferably about 0.5 mil (0.012 mm). It may have a sheet resistivity of between about 10 and 100 milliohms/sq. A preferred conductive coating 40 for the composite label/tester of the invention is formed of a polymer based silver ink. This ink is composed of silver flakes dispersed in a polymer solution. A suitable silver ink is available from Olin Hunt Conductive Materials (now sold by Acheson Dispersions) under the trade designation 725A(6S-54) polymer thick high conductive film. The resistivity of the ink and consequently that of conductive coating 40 may be adjusted for better calibration of the tester. This can be done by mixing into the silver ink a polymer based conductive graphite ink having a higher resistivity than the silver ink. A preferred polymer based conductive graphite ink is available under the trade designation 36D071 graphite ink from Olin Hunt Conductive Materials. Suitable conductive coating 40 compositions may contain between 75 and 100 wt % silver ink and between 0 and 25 wt % polymer based conductive graphite ink. The sheet resistivity of conductive coating 40 can also be controlled by adjusting its thickness.

The electrically conductive coating 40 is formed by applying the silver ink in varying geometrical patterns, for example, in a pattern which gradually narrows with length. Such patterns for the conductive coating are disclosed, for example, in U.S. Pat. No. 5,188,231, herein incorporated by reference. The silver ink may be applied by conventional printing methods after which it is dried and heat cured. The total resistance of conductive coating 40 may be between about 1 and 2 ohms.

Preferably, as shown in FIG. 1, there is a dielectric ink coating 30 between adhesive 20 and conductive coating 40. Dielectric coating 30 also provides structural support to conductive coating 40 and protects conductive coating 40 from attack by adhesive 20. Dielectric coating 30 desirably has the additional requirement that it does not interfere with the proper shrinkage of the label's major edges 120 and 125 over cell shoulders 130 and 135, respectively, when heat is applied to these edges. Dielectric coating 30 preferably has a thickness between about 0.2 and 0.5 mil (0.005 and 0.012 mm). A preferred dielectric coating 30 is a U.V. (ultra violet light) curable polymer coating containing acrylate functional oligomers such as that available under the trade designation 47MSB132 U.V. Dielectric Blue from Olin Hunt Conductive Materials. Adhesive coating 20 and dielectric coating 30 together have a combined thickness of less than about 1.6 mil (0.04 mm) and together they function as substitute for heat resistant film, e.g. polyester. Dielectric coating 30 can be of a suitable color to eliminate the need for color coating 15.

Preferably, as shown in FIG. 1, another dielectric coating 50 is located over conductive coating 40. Dielectric coating 50 is advantageously included to isolate and insulate conductive coating 40 from the cell housing (casing 80). In a preferred embodiment (FIG. 1) the ends of conductive coating 40 are not coated with dielectric 50, so that they may be pressed into contact with the positive and negative terminals of a cell. A preferred dielectric coating 50 is a U.V. curable polymer coating containing acrylate functional oligomer such as that available under the trade designation 47MSB132 U.V. Dielectric Blue coating from Olin Hunt Conductive Materials. Dielectric coating 50 has a thickness preferably between about 0.2 and 0.5 mils (0.005 and 0.012 mm). Both dielectric coatings 30 and 50 may be conveniently applied by conventional screen printing (flat or rotary screen), gravure or flexographic printing.

Figure 3:
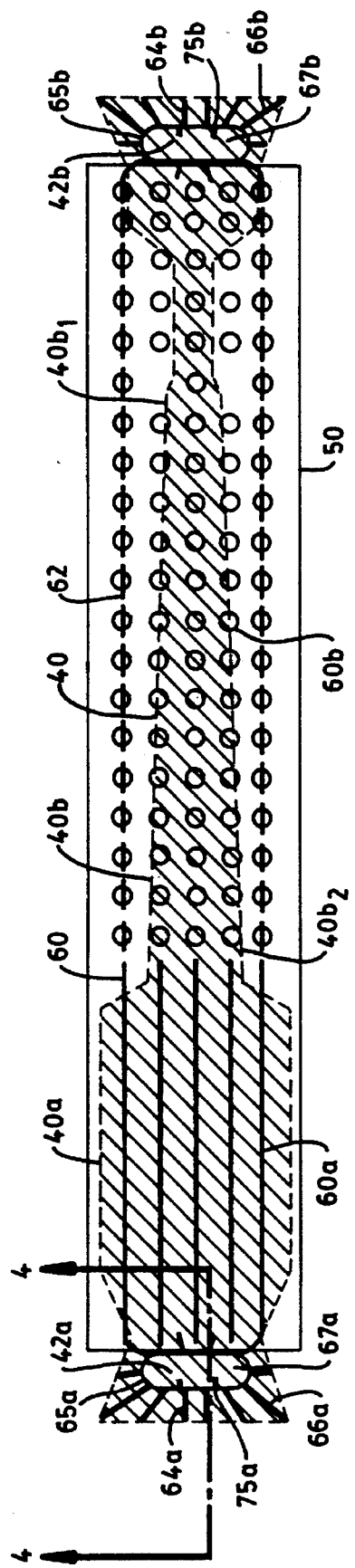
FIG. 3 is plan view of a portion of the tester composite of FIG. 1 illustrating preferred partition pattern and underlying conductive coating.
Figure 5:
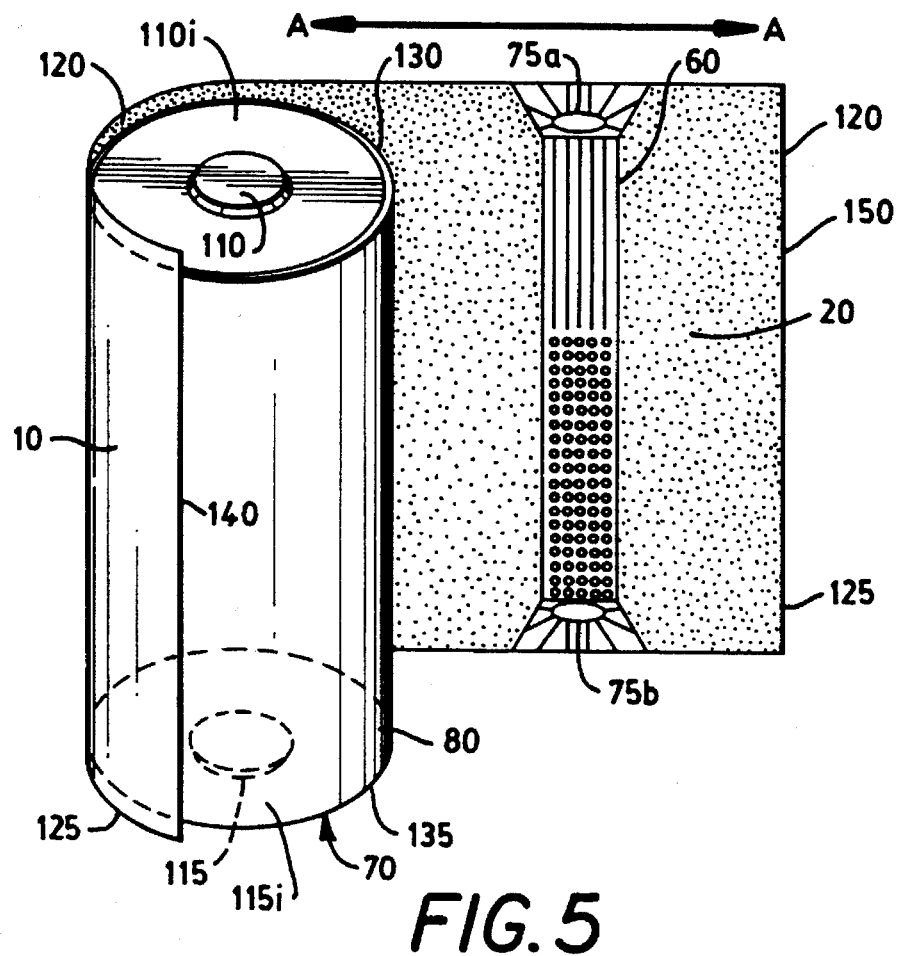
FIG. 5 is a perspective view showing the label/tester being applied to the cell.

A insulating partition coating 60 (FIG. 1) is located over dielectric coating 50. Partition coating 60 electrically insulates conductive coating 40 from cell casing 80 (FIG. 5). Partition coating 60 is multifunctional in that in addition to it being electrically insulating, a portion of it forms a region whereby the tester can be pressed into electrical contact with the terminals. Also, another portion of partition coating 60 provides thermal insulation for the conductive coating 40. When the label/tester composite is applied-to the cell partition 60 contacts the cell casing 80 (FIG. 5). Partition coating 6 is applied in a pattern creating cavities that extend clear through the coating thickness. At least a majority of the cavities create air pockets for thermal insulation between conductive coating 40 and cell casing 80 and thus allow the surface of conductive coating 40 to reach higher equilibrium temperature. As illustrated best in FIG. 3 partition coating 60 is formed of a body portion 62 and end portions 64a and 64b (FIG. 3). Body portion 62 desirably has a thickness between about 1.5 mil (0.038 mm) and 3.0 mil (0.075 mm). End portions 64(a) and 64(b) are each located preferably at extremities of partition coating 60 and comprise respective partition extremity portions 65a and 65b, and respective radiating ribs 66a and 66b. As illustrated in FIG. 3, dielectric coating 50 (located between conductive coating 40 and partition coating 60) covers body portion 62 but not extremity portions 65a and 65b. Partition portions 65a and 65b containing one or more cavities, e.g., 67a and 67b, respectively, within their boundary. These cavities form a part of extremities 75a and 75b, respectively. Extremities 75a and 75b allow the ends of conductive coating 40 to make electrical contact with the cell's negative and positive terminals, respectively, when finger pressure is applied to the region of the label directly over both extremities.

The body 62 of the partition pattern will be of relatively greater thickness than the other of the tester coatings in order to create proper partition of the conductive coating 40 from the cell and also to create insulating air pockets under the tester. Various curable materials, for example, acrylate functional epoxies, acrylate functional urethanes, and acrylate functional polyesters having suitable printing and durability characteristics may be employed for partition 60. Such materials are preferably U.V. curable and capable of being printed by screen process (flat or rotary) so that the required degree of thickness between about 1.5 and 7.0 mils (0.038 and 0.175 mm) for the body of the partition can be attained. This degree of thickness would be difficult to attain using solvent based inks or other solvent coating which must be pattern printed. The partition material, as all other tester components, should withstand exposure to elevated temperatures up to about 170° F., commonly employed during cell performance testing.

A preferred material for partition pattern 60 is formed of compounded polymers containing U.V. curable polymer such as acrylate functional epoxy or acrylate functional urethane polymer. The compounded material contains reactive oligomer, reactive monomer and thickening filler. The thickening filler may be silica filler such as AEROSIL 200 from Degussa Inc. Chemicals Division. It gives the material a rheology which makes it easier to print and keeps the material cohesive before curing. A preferred compounded blend for partition coating 60 is: Prepolymer blend product designation EBECRYL 4833 (Radcure Specialties Co., Norfolk Va.) containing urethane acrylate oligomer and N-vinyl-2-pyrrolidone (50 to 80 Wt %); reactive monomer hexane diol diacrylate (20–40 wt %); and AEROSIL 200 (0.1 to 5 wt %). The compounded blend is applied in the desired pattern using conventional screen printing process. The printed material is then cured by U.V. light to produce a hard, manually incompressible and thermally stable partition coating 60 of desired pattern. Partition coating 60 has a thickness between about 0.1 mil (0.0025 mm) and 7 mil (0.175 mm). The partition body portion 62 has a thickness preferably between about 1.5 mil (0.038 mm) and 7 mil (0.175 mm). A preferred partition 60 with conductive coating 40 showing therethrough is illustrated in FIG. 3.

Extremities 75a and 75b (FIG. 3) are comprised of partition end portion 65a and 65b, respectively and a portion of the conductive coating, namely 42a and 42b, respectively. The partition portion 65a and 65b each has a thickness desirably between 0.1 mil (0.0025 mm) and 2.0 mil (0.05 mm). Portion 65a and 42a have a combined thickness between about 0.35 mil (0.009 mm) and 3.0 mil (0.075 mm). Similarly, portion 65b and 42b have a combined thickness between about 0.35 mil (0.009 mm) and 3.0 mil (0.075 mm). The partition portions 65a and 65b form cavities (67a and 67b, respectively) which are advantageously of a polygonal, rectangular, oval, elliptical or circular shaped cavities extending through the thickness of partition coating 60. Since dielectric coating 50 covers only the body portion 62 of partition 60, end portions of conductive coating 40, i.e., portions 42a and 42b, preferably rest directly on partition portion 65a and 65b, respectively, with no coatings intervening therebetween. When the region of the label over conductive portion 42a is pressed, conductive portion 42a pushes down through the cavity 67a in the underlying partition coating and passed partition portion 65a until it makes electrical contact with a cell terminal or conductive surface in electrical contact with a cell terminal.

Similarly when the region of the label over conductive portion 42b is pressed, conductive portion 42b pushes down through the cavity 67b in the partition surface and passed partition portion 65b until it makes electrical contact with a cell terminal or conductive surface in electrical contact with a cell terminal. When pressure is removed the conductive portions 42a and 42b will return substantially to its original position above the partition surface. This may be accomplished many, many times.

There may be a series of ribs 66a and 66b (FIG. 3) radiating away from end portions 65a and 65b, respectively. These ribs tend to converge when the tester/label composite 5 is heat shrunk over the cell shoulders and thus permit extremities 75a and 75b to be heat shrunk neatly over the cell shoulders without bulging or distorting.

The conductive coating 40 normally comprises a low resistance portion 40a and a high resistance portion 40b as shown in FIG. 3. The high resistance portion 40b may have a gradually narrowing width from one end to the other as shown in FIG. 3. The narrower end $40b_1$ will reach higher surface equilibrium temperatures than the wider end $40b_2$ because of higher watt density (power consumed per unit surface area) at the narrower end. The partition pattern which covers the low resistance portion 40a is in the form of a plurality of parallel ribs 60a, preferably formed of the above disclosed partition material. Ribs 60a preferably extend along the length of the low resistance portion 40a. The partition pattern 60b which covers the high resistance portion 40b may desirably be formed of a plurality of small islands, e.g. dabs, of the partition material, thus creating thermally insulating air spaces or cavities herebetween.

A composite tester/label 5 can be manufactured in the following preferred manner: A heat shrinkable label backing 10 may be a base film preferably of unplasticized polyvinylchloride, or polypropylene film preferably of about 6 mils (0.15 mm) thickness is first heat-stretched in the machine direction (the direction in which the label is wrapped around the cell) resulting in a film thickness between about 1.5 and 4 mil (0.0375 and 0.1 mm). A partial layered substructure 7 (FIG. 2B) is first produced by coating label 10 with print layer 6 using conventional non-conductive inks. The non-conductive ink preferably has a total metal content of less than about 1000 ppm (dried weight basis). The ink should not degrade when exposed to alkaline environment such as may be present during manufacture of the cells. The thermochromic coating 12 may then be applied over a small section of the printed label along the label's width using conventional flat or rotary screen printing method. Thermochromic coating 12 may be U.V. cured whereupon its thickness is between about 1.0 and 3.0 mils (0.025 and 0.075 mm). Thermochromic coating 12 may then be overcoated with color coating 15 by conventional gravure, flexographic, or screen printing process. (Color coating 15 can be eliminated by relying on dielectric 30 to provide the indicator color, which would become visible when thermochromic coating 12 reached its response temperature.) Label 10 may be covered with a coating of adhesive 20 on the printed undersurface of the label. Adhesive 20 may be prepared and applied to the undersurface of the printed label forming substructure 7 in the manner above described.

Next, a transferable layered substructure 35 may be made by coating a heat stable release coated web 18 with a desired pattern of conductive coating 40. Substructure 35 or portion thereof may be referred to herein as a preform. (If the conductive coating is readily curable at a temperature below the temperature at which label 10 begins to shrink or otherwise distort, the conductive coating may alternatively be applied directly onto label 10 and cured thereon, without the need for web 18.) Web 18 may be any heat resistant film, for example, a polyester, paper or polycarbonate film precoated with a conventional release coating, typically silicone. Conductive coating 40 desirably contains a mixture of conductive silver flakes dispersed in a polymer solution as above described. Web 18 with the silver flake dispersion coated thereon is then passed through a heated oven until the coating is sufficiently cured. In addition to heat the conductive coating 40 may also be exposed to ultraviolet (U.V.) radiation to enhance its curing. Thereupon conductive coating 40 is coated with the above referenced dielectric ink 30 by conventional screen process, gravure or flexographic printing. (Optionally, thermochromic coating 12 could be applied directly over dielectric ink 30 while ink 30 is still on web 18 instead of applying coating 12 over print layer 6.) Web 18 containing dielectric ink 30 is passed through a conventional U.V. curing unit to polymerize and cure the coating. The layered substructure 35 (FIG. 2A) composed of conductive coating 40 coated with dielectric ink 30 may then be transferred from web 18 to layered substructure 7 (FIG. 2B) by pressing the exposed dielectric coating 30 to the bottom of adhesive portion 20. Thereupon, web 18 can be easily removed from substructure 35 by peeling, thereby leaving substructure 35 adhered to substructure 7.

A second dielectric ink coating 50 which may be of same composition, but preferably of different color shade, as dielectric ink 30 may be coated in any desired pattern directly onto the exposed conductive coating 40. Dielectric coating 50 may be printed onto conductive coating 40 by employing conventional screen process, gravure or flexographic printing technique. The coating 50 is then cured in conventional manner by subjecting it to irradiation from mercury vapor lamps, whereupon it has a thickness of about 0.2 mil.

After dielectric coating 50 has been applied and cured a partition pattern 60 is then applied over coating 50. Partition pattern 60 is preferably composed of a prepolymer blend of acrylated urethane oligomer (or acrylated epoxy oligomer), reactive monomer and thickening filler such as AEROSIL 200, as above referenced. The blend is advantageously applied by conventional flat or rotary screen process printing methods. In this process a screen fabric is coated to a stencil thickness of 18 to 80 microns. The screen mesh is desirably between about 100 and 200 threads per inch. The printed blend is then U.V. cured. The cured partition pattern 60 has a thickness of between about 1.5 and 7 mils (0.038 and 0.175 mm). The layered construction of composite label/tester 5, shown best in FIGS. 1 and 2C, is now complete. It may be protected with a release liner and stored until it is desired to apply it to the cell.

Figure 6:
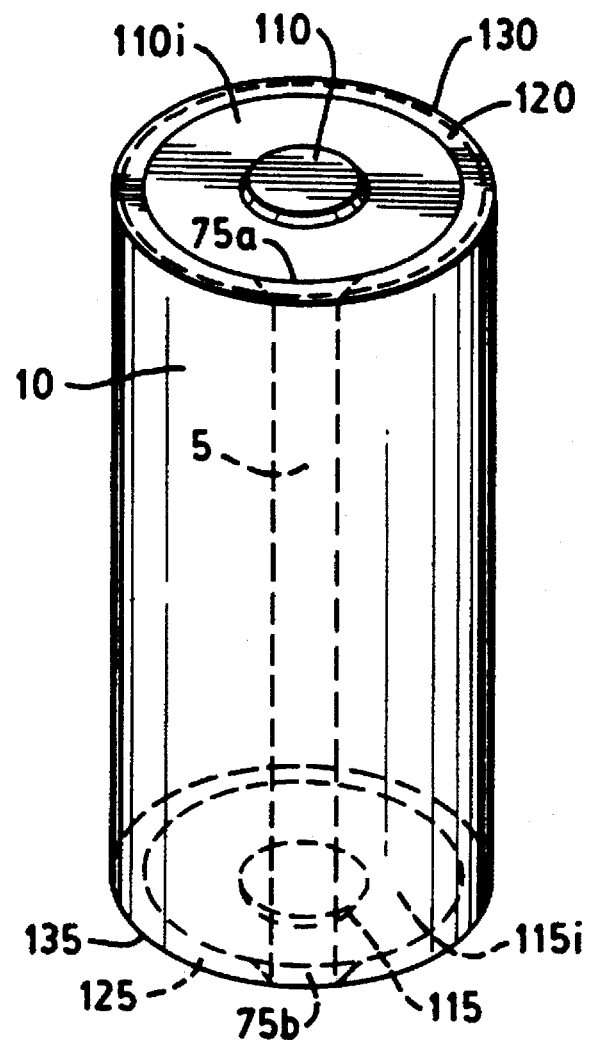
FIG. 6 is a perspective view showing the label/tester secured to the cell with the negative end of the cell visible at the top of the illustration.

The label/tester composite 5 of the invention is applied to a cell by first removing the release liner from the label and wrapping the label around the cell casing 80 as illustrated in FIG. 5. Exposed portions of adhesive coating 20 adheres to the cell casing. As aforementioned, the label edges 120 and 125 are preferably devoid of exposed adhesive. After the label is wrapped around the casing, heat may be applied to label edges 120 and 125 to heat shrink these edges around the cell shoulders 130 and 135, resulting in the configuration shown in FIG. 6. Since extremities 75a and 75b are preferably adjacent respective label edges 120 and 125, these extremities will also become heat shrunk over the cell shoulders 130 and 135, respectively. They will thereby come to rest in close proximity to cell surfaces 110i and 115i, respectively, as shown in FIG. 6. Cell portions 110i and 115i are electrically conductive and form part of the cell's terminal ends 110 and 115, respectively. After the label/tester 5 is secured to the cell, the portions of conductive coating 40 which form extremities 75a and 75b will remain insulated from electrical contact with the cell's terminals by partition portions 65a and 65b, respectively, until the tester is activated. The tester may be activated by manually pressing the surface of label 10 simultaneously over regions 42a and 42b.

Figure 4:
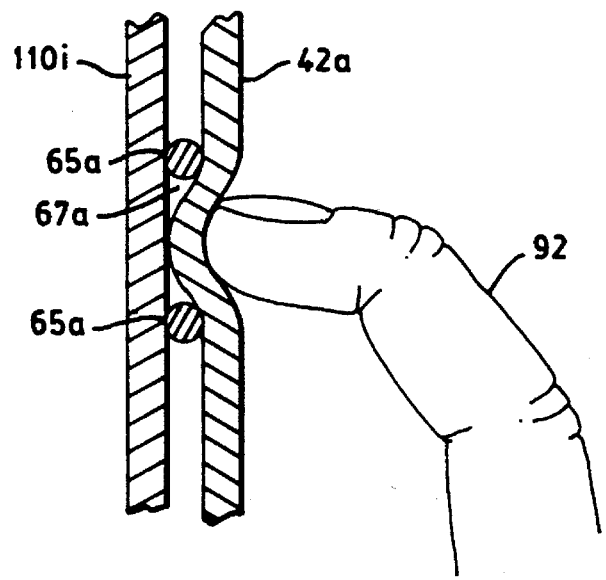
FIG. 4 is an enlarged cross sectional representation of a contact area shown with the conductive layer depressed into contact with an illustrative conductive material.

As may be seen best from FIG. 4, when a human finger 92 depresses conductive region 42a, this portion of the conductive coating penetrates through a cavity in partition portion 65a until it contacts conductive surface 110i. Similarly, when the conductive region 42b is depressed that portion of the conductive coating penetrates through the cavity in partition portion 65b until it comes into contact with conductive surface 115i which is in contact with positive terminal 115. When cell portions 110i and 115i are simultaneously contacted by the respective conductive portions 42a and 42b, heating in conductive coating 40 occurs which in turn activates thermochromic coating 12. Although a dual activation design described herein is preferred, alternatively one end of the conductive coating may be permanently secured to the cell so that it is in permanent electrical contact with one of the cell's terminals. This can be accomplished by using conductive adhesive between a portion of conductive coating 40 and a cell terminal or portion of the cell in electrical contact with the terminal. The other end of the conductive coating or portion thereof could employ an activating mechanism, e.g. 75(a) or 75b, described hereinabove. In such embodiment, in order to activate the tester, the user would need only to depress one end of the label/tester composite 5.

Another embodiment of the label/tester composite of the invention is composite 8 illustrated schematically in FIG. 7 which can be described with reference to FIGS. 8A–8C as follows. (The coatings shown in FIGS. 7 and 8A–8C having the same reference numbers as above discussed with reference to FIGS. 1 and 2A–2C can be of the same composition and applied by the same methods of printing as described in the foregoing.) The label/tester composite 8 (FIG. 8C) is constructed by first forming a first layered substructure 9 shown in FIG. 8B. Substructure 9 (FIG. 8B) is formed by applying a graphics print layer 6 to the inside surface of label 10 and then adhesive coating 20 onto print layer 6. (Preferred adhesive for coating 20 and preferred methods of application have been described in the foregoing.) A transferable layered substructure 36 on releasable web 18 may then be prepared by first applying a conductive coating (silver ink above described) onto a releasable (e.g. silicone coated) web 18 and then heat curing the coating to form cured conductive coating 40. (Substructure 36 or portion thereof may be referred to herein as a preform.) Then color coating 15 may be applied over conductive coating 40 and in turn thermochromic coating 12 applied over color coating 15. Substructure 36 (FIG. 8A) comprising coatings 12, 15, and 40 may then be transferred from release coated web 18 to layered substructure 9 by pressing thermochromic coating 12 of substructure 36 onto adhesive coating 20 of substructure 9 and then peeling away web 18. Thereupon dielectric coating 50 may be applied over the exposed conductive coating 40 and partition coating 60 may be applied over dielectric coating 50, thus forming the final label/tester composite illustrated in FIGS. 8 and 9C.

Figure 7:
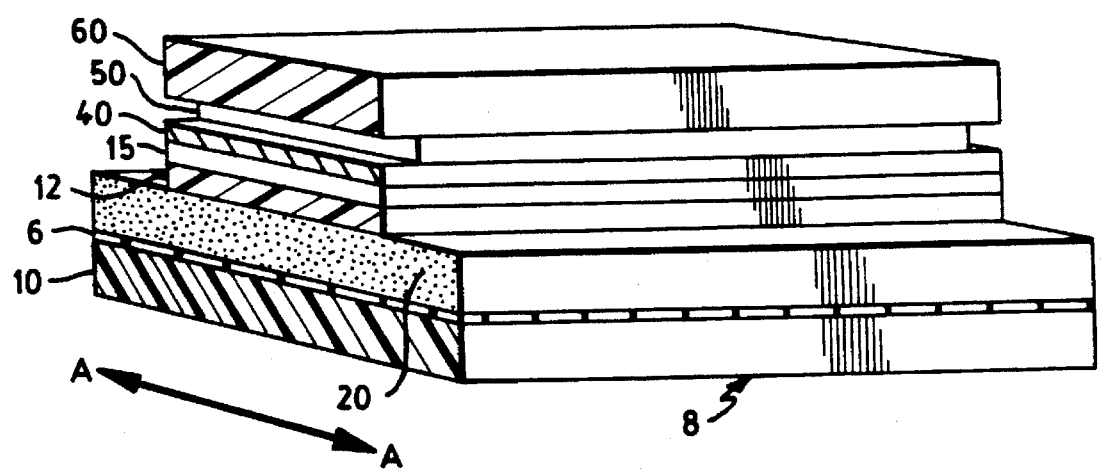
FIG. 7 is an isometric view of another embodiment of the cell tester integrated with the label forming the label/tester composite of the invention.
Figure 8A:
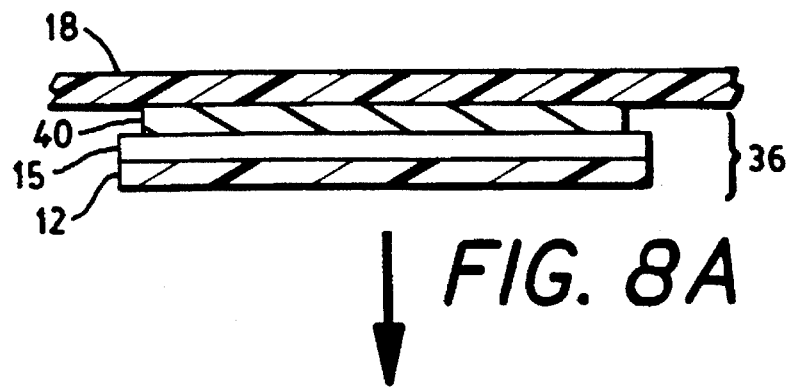
FIG. 8A is a schematic representation showing manufacture of a portion of the label/tester composite by transfer of the thermochromic coating and conductive coating from a release web to the partial composite of FIG. 8B.
Figure 8B:
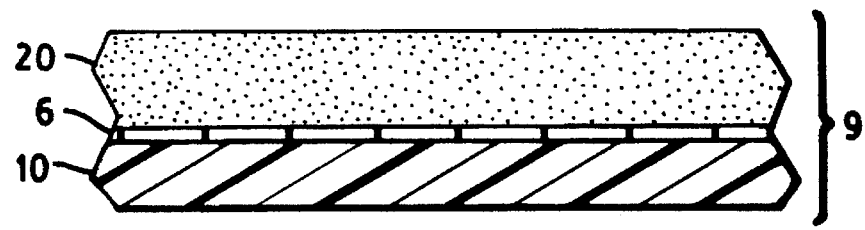
FIG. 8B is an end view of a portion of the label/tester composite shown in FIG. 7.
Figure 8C:
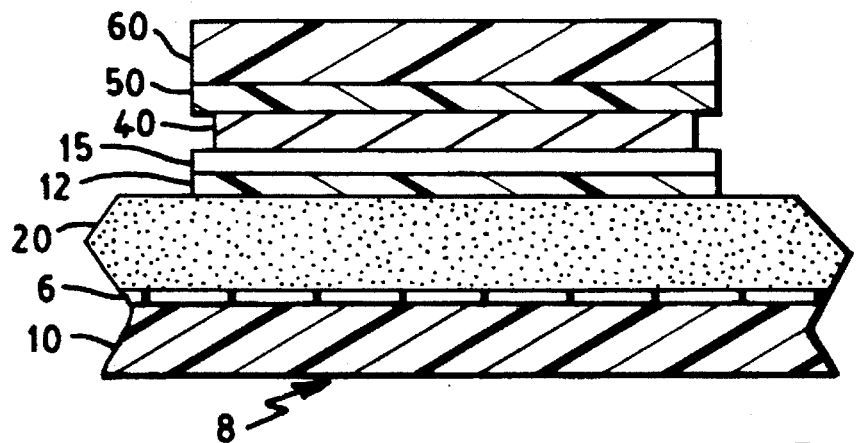
FIG. 8C is an end view of the completed label/tester embodiment of FIG. 7.
Figure 9:
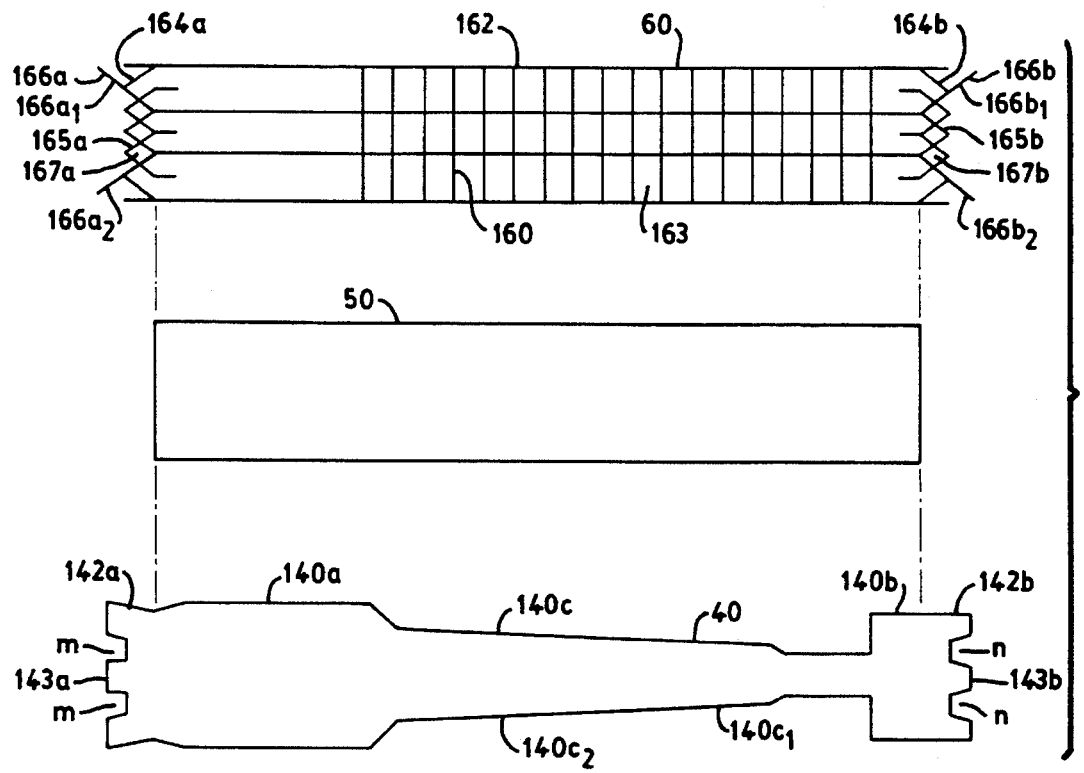
FIG. 9 are plan views of the partition coating, conductive coating and dielectric coating therebetween for the embodiment represented in FIG. 7.

A preferred configuration for the conductive coating 40, dielectric coating 50 and partition coating 60 referenced in FIGS. 7 and 8C is illustrated in FIG. 9. Partition coating 60, illustrated in FIG. 9, is formed of a body portion 162 and end portions 164a and 164b. Body portion 162 desirably has a thickness between about 1.5 mil (0.038 mm) and 7.0 mil (0.18 mm). Body portion 162 is preferably formed in a pattern of criss-crossed horizontal and vertical ribs which form a plurality of air pockets 163 which provide thermal insulation between the label/tester composite 8 and cell casing 80. End portions 164a and 164b are each located respectively at opposing extremities of coating 60 as illustrated in FIG. 9. End portions 164a and 164b each comprise respective partition end portions 165a and 165b and respective partition tip portions 166a and 166b. Partition end portions 165a and 165b form cavities 167a and 167b, respectively which are preferably of polygonal, rectangular, oval, elliptical, or circular shape. The partition end portions 165a and 165b form boundaries around one or more such cavities, i.e. spaces, in the partition coating 60 at opposing ends thereof. The area of these cavities (facing conductive coating 40) may be between about 1.5 mm$^2$ and 20.0 mm$^2$, preferably between about 8 and 20 mm$^2$, and form a part of extremities 175a and 175b, respectively. Partition tip portion 166a preferably comprises a pair of slanted ribs 166a$_1$ and 166a$_2$ which jut out from one end of the partition coating. Partition tip portion 166b preferably comprises a pair of slanted ribs 166b$_1$ and 166b$_2$ which jut out from the opposite end of the partition coating.

Electrically conductive coating 40 (FIG. 9) comprises low resistance portions 140a and 140b at respective ends of the conductive coating and a high resistance portion 140c therebetween. In practice the high resistance portion 140c forms the heat generating portion of the conductive coating 40, i.e. it is designed to be capable of generating sufficient heat so that the thermochromic coating 15 in thermal contact therewith will change in appearance when the ends of conductive coating 40 are pressed into electrical contact with the terminals of a fresh cell. The heat generating portion 140c may have a gradually narrowing width along a major portion of the length of the conductive coating so that the narrower end 140c$_1$ will reach a higher surface equilibrium temperature than the wider end 140c$_2$ when the tester is activated. This allows determination of the strength of the cell. For example, if the cell is weak only the portion of thermochromic coating 40 over the narrowest portion (140c$_1$) will change in appearance. When the cell is fresh the thermochromic coating over the entire heat generating portion (140c$_1$ and 140c$_2$) of the conductive coating 40 will change in appearance.

In the embodiment shown in FIG. 9, preferably two or more conductive fingers 143a jut out from the end of conductive portion 142a and similarly two or more fingers 143b jut out from opposing low resistance end 140b. The individual fingers 143a are separated from each other by small spaces (m) therebetween. Similarly individual fingers 143b are separated from each other by small spaces (n) therebetween. When the ends of the label/tester composite are heat shrunk over the cell shoulders 130 and 135, the spaces between each set of fingers become smaller, thus tending to merge the individual fingers in each set. The small spaces between the fingers prevent bulging or warping of the ends of the label/tester composite when heat is applied thereto to heat shrink those ends over the cell shoulders.

Figure 10:
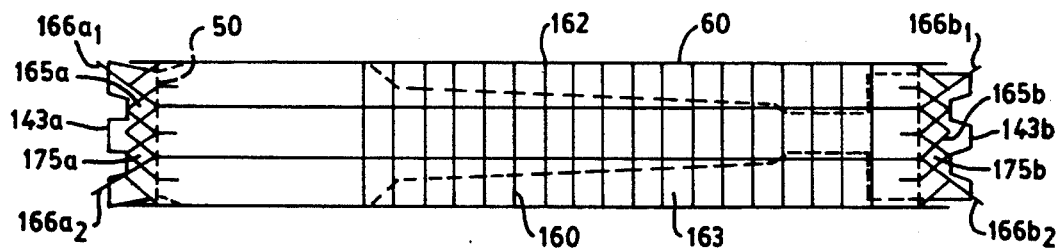
FIG. 10 is an assembled plan view of the coatings depicted in FIG. 9.

Coatings 40, 50 and 60 of FIG. 9 are shown assembled in FIG. 10. In this embodiment dielectric coating 50 is sandwiched between conductive coating 40 and partition 60. Dielectric coating 50 is shorter than both conductive coatings 40 and partition coating 60 and covers only the body portion 162 of partition coating 60. Thus, end portions of conductive coating 40, i.e. portions 142a and 142b as well as conductive fingers 143a and 143b can rest directly on the partition coating, preferably with no intervening coatings therebetween. In this assembly, partition ribs 166a$_1$ and 166a$_2$ provide support and electrical insulation for the overlying conductive coating 143a at one end of the tester. Partition ribs 166b$_1$ and 166b$_2$ provide support and electrical insulation for the overlying conductive coating 143b at the opposite end of the tester.

Extremities 175a and 175b at opposing ends of the label/tester composite 8 are each comprised of partition end portion 165a and 165b, respectively, and a portion of the conductive coating, namely 142a and 142b, respectively. The partition end portions 165a and 165b have a thickness desirably between 0.1 mil (0.0025 mm) and 2.0 mil (0.05 mm). Portions 165a and 142a have a combined thickness between about 0.35 mil (0.009 mm) and 3.0 mil (0.075 mm). Similarly, portions 165b and 142b have a combined thickness between about 0.35 mil (0.009 mm) and 3.0 mil (0.075 mm).

When the region of the label over conductive portion 142a is pressed, the conductive portion 142a pushes down through the underlying gap formed in partition portion 165a and passes therethrough until it makes electrical contact with a cell terminal or conductive surface in electrical contact with a cell terminal. When pressure is removed, the conductive portion returns to its original position above the partition surface. Conductive fingers 143a which rests on partition ribs 166a$_1$ and 166a$_2$ respectively, can also be to come into electrical contact with a cell terminal by pressing down on the portion of the label directly over said fingers. Thereupon, conductive portions 143a passes through the cavity in the partition coating between ribs 166a$_1$ and 166a$_2$ until it makes electrical contact with a cell terminal or conductive surface in electrical contact with a cell terminal. When pressure is removed conductive portion 143a returns to its original position above partition ribs 166a$_1$ and 166a$_2$. Conductive fingers 143b on the opposite end of the tester can be made to come into electrical contact with a cell terminal in the same manner by pressing down on the portion of the label directly over end portion 143b, whereupon said conductive fingers pass through the cavity in the partition coating between ribs 166b$_1$ and 166b$_2$ to make electrical contact with a cell terminal.

The label/tester composite 8 shown in the alternate embodiment of FIG. 7 may be applied to the cell in the same manner as described with reference to the embodiment of FIG. 1; namely, by wrapping the label around the cell casing 80 with the adhesive side of the label in contact with the cell casing and then heat shrinking the ends of the label over the cell shoulders 130 and 135.

Figure 11:
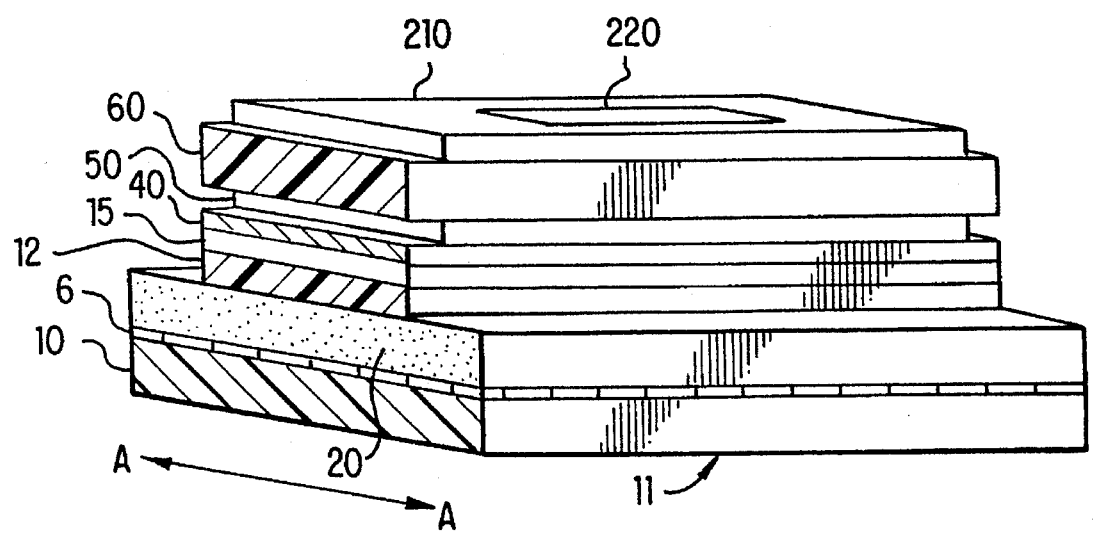
FIG. 11 is an isometric view of another embodiment of the cell tester integrated with the label forming the label/tester composite of the invention.

A preferred embodiment of the label/tester composite of the invention is composite 11 illustrated schematically in FIG. 11. The details of the topmost layers of composite 11, namely layers 40, 50, 60 and 210 are illustrated best in FIGS. 12 and 13. (The coatings shown in FIGS. 11–13 having the same reference numbers as above discussed with respect to any of the preceding embodiments may be of the same composition and applied by the same methods of printing as described in the foregoing.) The tester/label composite 11 shown in FIG. 11 may be the same as composite 8 shown in FIG. 7 and is prepared by the same method above described with reference to FIGS. 8A–8C except that an additional layer, namely, insulating substrate 210, is added over the partition coating 60 so that when the tester/label composite is applied to the cell, the insulating substrate 210 contacts the cell casing 80.

Insulating substrate 210 provides electrical and thermal insulation, and is comprised of material which has one or more holes or openings 220 therethrough which form one or more thermally insulating air pockets when the composite 11 is applied to the cell casing. Most of the thermal insulation is provided by air trapped in the hole or opening 220 and therefore the substrate 210 material does not itself have to have an extremely high thermal insulating property. Substrate 210 is desirably of a material having a thermal conductivity of less than about 10 watt $m^{-1}$ $K^{-1}$. The material is also preferably substantially electrically nonconductive (i.e., essentially electrically nonconductive when compared to metals). Desirably, the substrate 210 material has a volume resistivity of greater than about $2.7 \times 10^6$ ohm-cm (sheet resistivity greater than about 550 megohms per sq. @ 2 mil). Substrate 210 should also be sufficiently heat resistant that it does not shrink or distort when exposed to temperatures up to about 140° F. Accordingly, substrate 210 may be selected from a wide range of materials such as plastic film, polymeric foam, paper and combinations thereof. Substrate 210 desirably has a thickness between 2 and 12 mil (0.05 and 0.3 mm), preferably between 4 and 7 mil (0.1 and 0.18 mm), and is most preferably of paper. The paper may be uncoated or coated paper. The density of the paper is not critical, although porous paper may be preferable because it provides somewhat better thermal insulation. Instead of paper, substrate 210 may be a plastic film having the above described properties. For example, if a plastic film is chosen, it may desirably be selected from among high density polyethylene, high density polypropylene, polyester, polystyrene, and nylon. Alternatively, substrate 210 may a polymeric foam such as polyurethane foam. Substrate 210 may be formed of composite material comprising laminates of two or more plastic films, or plastic film extruded onto paper or polymeric foam. Such composite material for substrate 210, for example, may be polyester laminated to polyethylene, e.g. by coextrusion, or spun bound polyester extruded onto paper. In the latter case the polyester side of the composite would face and contact cell casing 80. While composite materials are not regarded as necessary, they do offer an added degree of protection against seepage into the tester interior of residual trace amounts of KOH or other contaminates, which can be present on the cell casing.

Figure 12:
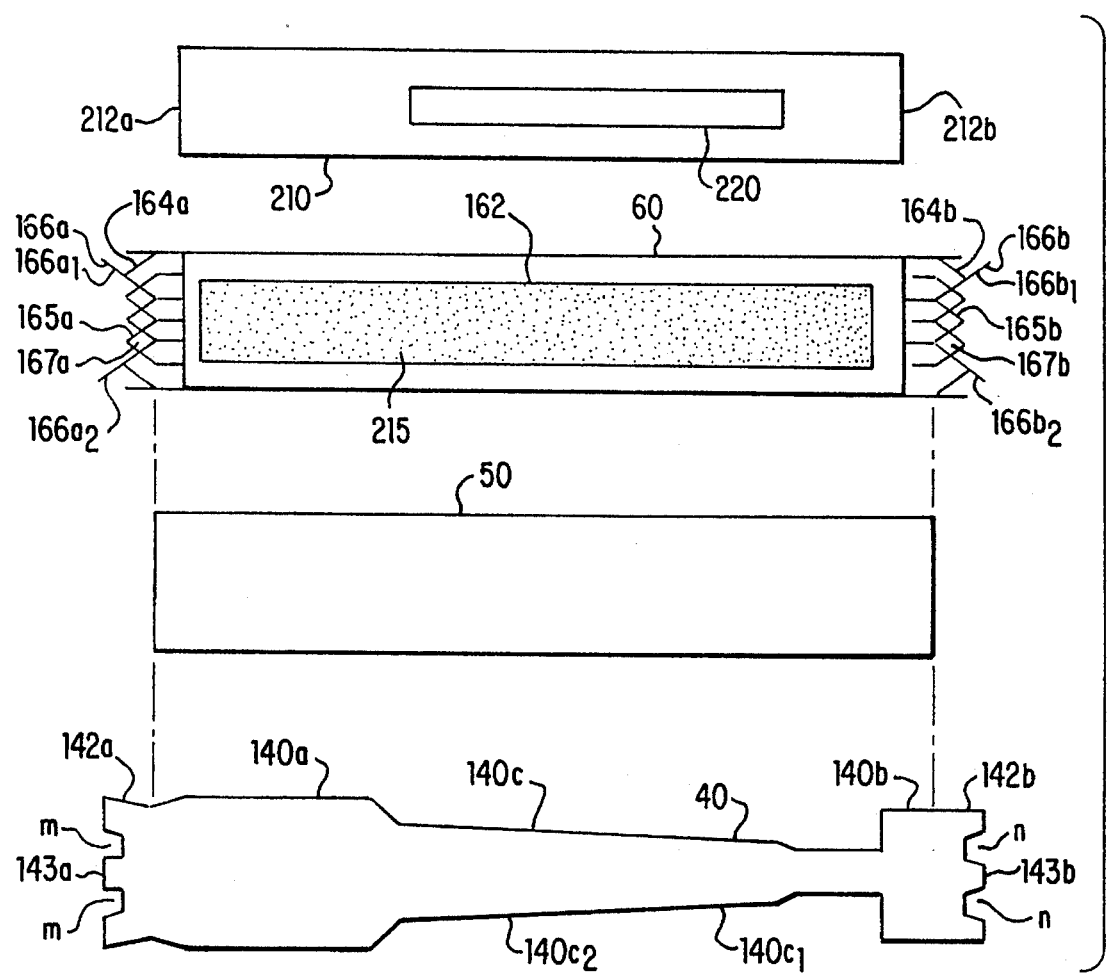
FIG. 12 are plan views of the insulating substrate, partition coating, conductive coating and dielectric coating therebetween for the embodiment represented in FIG. 11.
Figure 13:
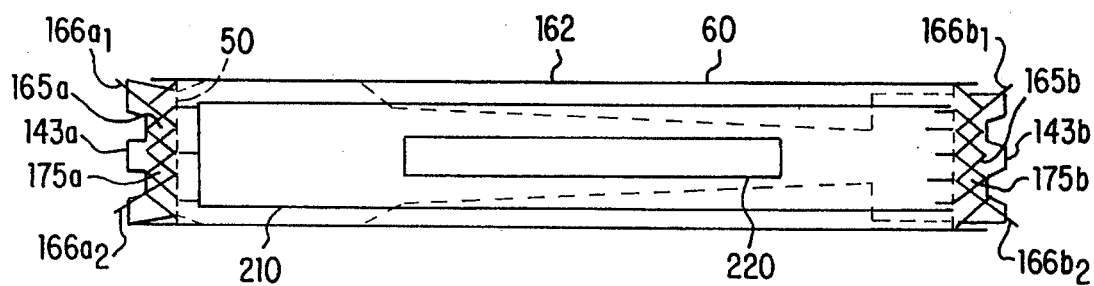
FIG. 13 is an assembled plan view of the elements depicted in FIG. 12.

The opening(s) in substrate 210 is preferably in the form of a single window 220 which is large enough to cover a substantial portion of the heat generating portion ($140c_1$ and $140c_2$) of conductive coating 40 (FIG. 12). (The term "heat generating portion of conductive coating 40" as used herein shall refer to the portion of the conductive coating 40 which overlies the thermochromic coating 12 (FIG. 11) and generates sufficient heat when the conductive coating is electrically connected to the terminals of a fresh, undischarged cell to cause a responsive change in appearance of the thermochromic coating in thermal contact therewith.) Window 220 desirably covers a greater surface area than the largest of any cavities 167a and 167b through which a portion of conductive coating 40 may be manually pushed to activate the tester. Cavities 167a and 167b cover an area desirably between about 1.5 and 20 $mm^2$ on the side facing conductive coating 40 and said cavities have a depth between about 0.1 mil (0.0025 mm) and 2.0 mil (0.05 mm).

The window 220 should be large enough to provide the desired thermal insulation between the heat generating portion of conductive coating 40 and cell casing 80. Window 220 should also be large enough that it does not interfere with attainment of a visually acute thermochromic display when the cell is activated. The width of window 220, i.e. its dimension along the cell's circumferential direction should not be so great in relation to the window's depth that the pressure of label 10 when it is wrapped around cell casing 80 causes any portion of the tester (exclusive of substrate 210) to sink into the window area and contact the usually cylindrical cell housing. A preferred window 220, therefore, is one of an elongated or oblong slot configuration, e.g. rectangular or elliptical or other such configurations having a smaller width than length. The window 220 is aligned in relation to the cell so that its width is substantially in the circumferential direction of the cell. For example, a rectangular window 220 is illustrated in FIG. 12. The rectangular window 220 in this embodiment may typically have a width of about 1.5 mm, length of about 20 mm and thickness of about 0.15 mm. Such dimensions reflect a width sufficiently small and thickness sufficiently great to prevent any portion of the label/tester composite (exclusive of substrate 210) from contacting the cell housing through said window when the label 10 is wrapped around the cell.

In the embodiment shown in FIG. 12 window 220 desirably has an area which is at least 40% and preferably at least 60% of the surface area of one side of the heat generating portion of conductive coating 40. In the embodiment shown in FIG. 12 window 220 may have an area which is as high as at least 80% of the surface area of one side of the heat generating portion of conductive coating 40. In connection with such embodiment the body portion 162 of partition coating 60 may contain a pattern of gaps or openings in its surface such as openings 163 shown in FIG. 9. However, the body portion 162 is preferably a continuous coating with no openings or gaps in its surface. Such embodiment utilizing a continuous body portion 162 in combination with an insulating substrate 210 having a large window opening 220 therethrough is illustrated in FIG. 12. Body portion 162 has a thickness between 0.1 mil (0.0025 mm) and 7 mil (0.18 mm), preferably between about 0.1 mil (0.0025 mm) and 2 mil (0.05 mm). When a continuous body 162 is employed for partition coating 60 (FIG. 12) it may be possible to eliminate dielectric coating 50. But the inclusion of dielectric coating 50 is nevertheless very desirable because it provides additional electrical insulation between conductive coating 40 and cell casing 80 and also helps to prevent any residual KOH on the cell casing or caustic vapors generated by the cell from penetrating into conductive coating 40 and thermochromic coating 12. As illustrated in FIG. 12 end portions 164a and 164b may of the same design and structure as previously described with respect to the embodiment illustrated in FIG. 9.

When the label/tester composite 11 is assembled and applied to the cell casing, air trapped within window 220 serves to thermally insulate the side of conductive coating 40 closest to the insulating substrate 210. The entrapped air causes the opposite side of conductive coating 40 and thermochromic coating 12 in heat communication therewith to reach a higher temperature when the tester is activated than if no window or other openings were employed in substrate 210. A pattern of small openings in insulating substrate 210 could be used to provide air insulation instead of or all or part of window 220. For example, window 220 could be made smaller and additional openings made in substrate 210 around or in the vicinity of the window. However, the substrate material forming the pattern of small openings in insulating substrate 210 tends to transfer some heat or reflect light and thereby interferes with the appearance of the thermochromic display when the tester is activated. That is, a pattern of small openings in substrate 210 tends to show through the display area when the tester is activated. Thus, the best effect is achieved when a single large window 220 is employed in insulating substrate 210 over the heat active portion of conductive coating 40. Also, it has been determined that a single large window 220 can provide the required degree of thermal insulation from air trapped therein making it unnecessary to have additional openings in substrate 210.

A depth of between about 2 and 12 mil (0.05 and 0.3 mm), preferably between 4 and 7 mil (0.1 and 0.18 mm) for window 220 has been determined to satisfactorily provide the required thermal insulation. Such range is sufficiently low that it does not require any adjustment in the cell casing diameter for commercial alkaline cells. In the embodiment shown in FIG. 12 window 220 may have a typical dimension 20 mm×1.5 mm×0.15 mm. There is a thin adhesive coating 215, for example, of thickness between about 0.1 and 0.3 mil (0.0025 and 0.075 mm) between insulating substrate 210 and partition coating 60 bonding substrate 210 to partition coating 60. During assembly the adhesive coating 215 (FIG. 12) may conveniently be applied directly onto body portion 162 of partition coating 60 after coating 60 is applied over dielectric coating 50. The adhesive may be applied to body portion 162 in a continuous or discontinuous coating, for example, in the form of dots or lines which may be regularly or irregularly spaced. Adhesive 215, for example, may be applied over portion 162 of coating 60 as a series of closely spaced horizontal or vertical parallel lines. In this manner somewhat less adhesive can be employed than if a continuous coating were used. Substrate 210 is applied to adhere to the adhesive coated portion 162 of partition coating 60 and with window 220 aligned over the heat generating portion ($140c_1$ and $140c_2$) of conductive coating 60. A portion of the adhesive coating 215 on body 162 may underlie the window 220 but it does not enter the window volume. Alternatively, adhesive 215 may be applied directly to a surface of insulating substrate 210 which in turn may be applied to adhere to body portion 162 of partition coating 60.

Adhesive 215 does not require high bonding strength and can be selected from wide range of heat resistant adhesives. Preferably adhesive 215 is a U.V. (ultraviolet light) curable pressure sensitive adhesive. A suitable adhesive of this type is available in a prepolymer liquid mixture under the trade designation Deco-Rad 7024 U.V. curable adhesive from Deco-Chem Co., Mishawaka, Ind. This prepolymer liquid may be applied to partition body 162 by conventional printing methods, for example, by flexographic printing and then subjected to ultraviolet light to cure the coating. After substrate 210 is bonded to partition body 162, tester/label composite 11 may then be applied to cell casing 80 with ends 164*a* and 164*b* heat shrunk over cell shoulders 130 and 135, respectively, in the manner described with reference to the previous embodiments.

Although the present invention has been described with reference to specific embodiments and materials it should be understood that modification to these embodiments as well as substitute materials are possible. For example, having described the desired performance characteristics of the adhesive coating 20, it may become apparent to those skilled in the art that alternatives to the preferred pressure sensitive adhesives described herein are possible. Also, although preferred specific materials have been described for the electrically and thermally insulating layers, it should be recognized that substitute materials within the concept of the invention are possible. Accordingly, the present invention is not intended to be limited to the specific embodiments and materials described herein, but is defined by the claims and equivalents thereof.

What is claimed is:

1. In combination, an electrochemical cell and a label/tester composite; said cell comprising positive and negative terminals and a metal housing; said label/tester composite being attached to the cell housing, a portion of said housing forming one of said terminals; said composite including a film having a thermochromic material disposed thereon, an electrically conductive material in thermal contact with the thermochromic material, means for thermally insulating said conductive material from the cell housing, wherein a portion of said conductive material is capable of generating sufficient heat when electrically connected to the terminals of said cell when undischarged to cause a change in appearance in the thermochromic material in thermal contact therewith and wherein said means comprises an opening in a surface of a substantially electrically nonconductive material so that the perimeter of said opening is defined by said nonconductive material, wherein said opening is of sufficient size to equal at least 40% of the surface area of one side of said heat generating portion of said conductive material.

2. The combination of claim 1 wherein said opening is an elongated slot having a smaller width than length and aligned in relation to the cell so that its width is substantially in the circumferential direction of the cell housing.

3. The combination of claim 1 wherein said electrically nonconductive material is of sufficient thickness to provide thermal insulation from air trapped in said opening.

4. The combination of claim 1 wherein the cell is cylindrical and the thickness of said electrically nonconductive material and the width of said opening are predetermined so that no portion of the label/tester composite exclusive of said electrically nonconductive material contacts the cell housing through said opening when the composite is attached to the cell.

5. The combination of claim 1 wherein said electrically nonconductive material has a volume resistivity greater than about $2.7 \times 10^6$ ohm-cm and a thermal conductivity less than about 10 watt $m^{-1}$ $K^{-1}$.

6. The combination of claim 1 wherein the thickness of said electrically nonconductive material having said opening therein is between about 2 mils and 12 mils (0.05 mm and 0.3 mm).

7. The combination of claim 5 wherein said opening equals an area of at least 60% of the surface area of one side of said heat generating portion of said conductive material.

8. The combination of claim 5 wherein said electrically nonconductive material is selected from the group consisting of paper, plastic film, polymeric foam and any combination thereof.

9. The combination of claim 5 wherein said electrically nonconductive material comprises paper.

10. The combination of claim 1 further comprising a partition coating between said conductive material and said electrically nonconductive material, said partition coating having at least one cavity extending through the thickness thereof, wherein a portion of the conductive material is positioned over said cavity; the tester being activatable by applying manual pressure over the conductive portion over said cavity thereby causing it to be pushed therethrough and electrically contact a cell terminal.

11. The combination of claim 10 wherein a portion of said partition coating covers an opening in said electrically nonconductive material and wherein said portion covering said opening is a continuous coating having no gaps in its surface.

12. The combination of claim 10 wherein a portion of said partition coating covers an opening in said electrically nonconductive material and wherein said portion covering said opening is a coating having at least one gap in its surface.

13. The combination of claim 1 wherein the metal housing of said cell has a cylindrical wall with first and second shoulders at respective ends thereof, and wherein said label/tester composite comprises means for permitting at least one end of the composite to be heat shrunk evenly over one of said cell shoulders.

14. The combination of claim 13 wherein said means for said at least one end of the composite to be heat shrunk evenly comprises at least two fingers protruding from said end of the conductive material.

15. The combination of claim 1 wherein said film having the thermochromic material disposed thereon is a heat shrinkable film selected from the group consisting of unplasticized polyvinylchloride and polypropylene.

16. The combination of claim 1 wherein said film is a heat shrinkable film printed with graphics on one side thereof and wherein said film has pressure sensitive adhesive on the same side thereof as the graphics, and said composite is attached to the cell by wrapping it around the cell housing so that the adhesive contacts the housing.

17. The combination of claim 1 wherein the label/tester composite has a thickness of less than 100 mils (2.5 mm).

18. The combination of claim 10 wherein an opening in said electrically nonconductive material has a greater area than the largest of any said cavity in said partition coating through which the tester is activatable.

19. The combination of claim 10 wherein at least one of said cavities through which the tester is activatable has a depth between about 0.1 mil (0.0025 mm) and 2.0 mils (0.05 mm).

20. The combination of claim 10 wherein said cavity and said conductive portion have a combined depth of between about 0.35 mil (0.009 mm) and 3.0 mil (0.075 mm).

21. The combination of claim 11 wherein the continuous portion of said partition coating covering said opening has a thickness between about 0.1 mil (0.0025 mm) and 7 mil (0.18 mm).

22. A label/tester composite for application to an electrochemical cell having a housing and a pair of terminals, said housing having a cylindrical wall with first and second shoulders at respective ends thereof, said label/tester composite comprising a base film and an adhesive coating over one side of the base film, a thermochromic material, an electrically conductive material in thermal contact with the thermochromic material, and separation means for maintaining the conductive material spaced from the housing when the composite is applied thereto, wherein the thermochromic material, the electrically conductive material, and said separation means are on the same side of the base film as the adhesive coating, said separation means comprising a material at least substantially electrically nonconductive and having an opening therein, said conductive material having at least two spaced apart fingers protruding from an end thereof whereby that end of the label/tester composite can be evenly heat shrunk over a shoulder of the cell.

23. The combination of claim 22 wherein a portion of said conductive material is capable of generating sufficient heat when electrically connected to the terminals of an undischarged cell to cause a change in appearance in the thermochromic material in thermal contact therewith, wherein said separation means comprising said electrically nonconductive material has an opening therein of sufficient size to equal at least 40% of the surface area of one side of said heat generating portion of said conductive material, said opening providing thermal insulation from air entrapped therein when said composite is applied to the cell housing.

24. The combination of claim 23 wherein said electrically nonconductive material is selected from the group consisting of paper, plastic film, polymeric foam and any combination thereof.

25. The combination of claim 23 wherein the depth of an opening in said electrically nonconductive material is between about 2 mils and 12 mils (0.05 and 0.3 mm).

26. The combination of claim 23 wherein an opening in said electrically nonconductive material covers an area of at least 60% of the surface area of one side of said heat generating portion of said conductive material.

27. The combination of claim 22 further comprising a partition coating between said conductive material and said electrically nonconductive material, said partition coating having at least one cavity extending through the thickness thereof, wherein a portion of the conductive material is positioned over said cavity; the tester being activatable by applying manual pressure over the conductive portion over said cavity thereby causing it to be pushed therethrough and electrically contact a cell terminal.

28. The combination of claim 27 wherein an opening in said electrically nonconductive material has a greater area than the surface area of the largest cavity through which the conductive portion may be pushed to electrically contact a cell terminal.

29. The combination of claim 27 wherein a portion of said partition coating covers an opening in said electrically nonconductive material and wherein said portion of the partition coating covering said opening is a continuous coating having no gaps in its surface.

30. The combination of claim 27 wherein said electrically nonconductive material is bonded to said partition coating with an ultraviolet light (U.V.) curable adhesive.

31. In a label/tester composite for application to an electrochemical cell having a housing and a pair of terminals, said label/tester composite of the type comprising a base film and an adhesive coating over one side of the base film, a thermochromic material, an electrically conductive material in thermal contact with the thermochromic material, and separation means for maintaining the conductive material spaced from the housing when the composite is applied thereto, wherein the thermochromic material, the electrically conductive material, and said separation means are on the same side of the base film as the adhesive coating, wherein a portion of said conductive material is capable of generating sufficient heat when electrically connected to the terminals of an undischarged cell to cause a change in appearance in the thermochromic material in thermal contact therewith, the improvement comprising said separation means comprising a substantially electrically nonconductive material having an opening through a surface thereof, said opening being of sufficient size to equal at least 40% of the surface area of one side of said heat generating portion of said conductive material, said opening providing thermal insulation from air entrapped therein when said composite is applied to the cell housing.

32. The combination of claim 31 wherein said electrically nonconductive material has an opening therein of sufficient size to cover at least 60% of the surface area of one side of said heat generating portion of said conductive material, said opening providing thermal insulation from air entrapped therein when said composite is applied to the cell housing.

33. The combination of claim 31 wherein said electrically conductive material comprises a paper sheet having an opening therein equaling an area of at least 80% of the surface area of one side of said heat generating portion of said conductive material.

* * * * *